Feb. 16, 1960 P. M. FISCHER ET AL 2,925,493

AMPLIFIER SYSTEMS

Filed Oct. 29, 1956 2 Sheets-Sheet 1

Inventors
Paul M. Fischer
Leon H. Flattum
By
Attorney

Inventors
Paul M. Fischer
Leon H. Flattum
By H R Rather
Attorney

United States Patent Office 2,925,493

Patented Feb. 16, 1960

2,925,493

AMPLIFIER SYSTEMS

Paul M. Fischer and Leon H. Flattum, Milwaukee, Wis., assignors to Cutler-Hammer, Inc., Milwaukee, Wis., a corporation of Delaware Application October 29, 1956, Serial No. 618,865

8 Claims. (Cl. 250—27)

This invention relates to improvements in amplifier systems.

While not limited thereto, the invention is especially applicable to amplifying a very low input signal to a very high output power signal required in motor control systems and the like.

Various expedients have been proposed to eliminate difficulties attendant on pickup of undesirable voltages by high gain amplifiers. Such voltage pickup is especially troublesome when portions of the system must be placed in widely separated locations. Among other things, it has been proposed to operate an amplifier at a high frequency to minimize spurious or stray voltage pickup but with the added requirement of an oscillator having inherent frequency drift problems. It has also been proposed to use a direct current amplifier but its susceptibility to drift renders the latter objectionable.

Therefore, it is desirable to provide an improved amplifier system simple in construction and linear in operation which avoids the aforementioned disadvantages of both the high frequency amplifier and the direct current amplifier. It is also desirable to provide an improved amplifier of the aforementioned type which may be operated from a conventional 60-cycle power supply source.

Accordingly, a primary object of the present invention is to provide improved means affording the aforementioned and other functions.

A more specific object of the invention is to provide improved amplifier means which is not sensitive to spurious voltages even if portions of such means are placed in widely separated locations.

A still more specific object of the invention is to provide new and improved high gain phase sensitive amplifying means.

A further specific object of the invention is to provide amplifier means of the aforementioned type which is simple in construction and operation.

Other objects and advantages of the invention will hereinafter appear.

While the amplifier system of the present invention is described in connection with a tension control system wherein the input signal of the amplifier system is derived from load cells, it is to be understood that we do not intend to confine our invention to the particular preferred embodiment or use disclosed, inasmuch as it is susceptible of various modifications and has wider application in other and different systems without departing from the scope of the appended claims.

Referring to the accompanying drawings.

Figure 1:
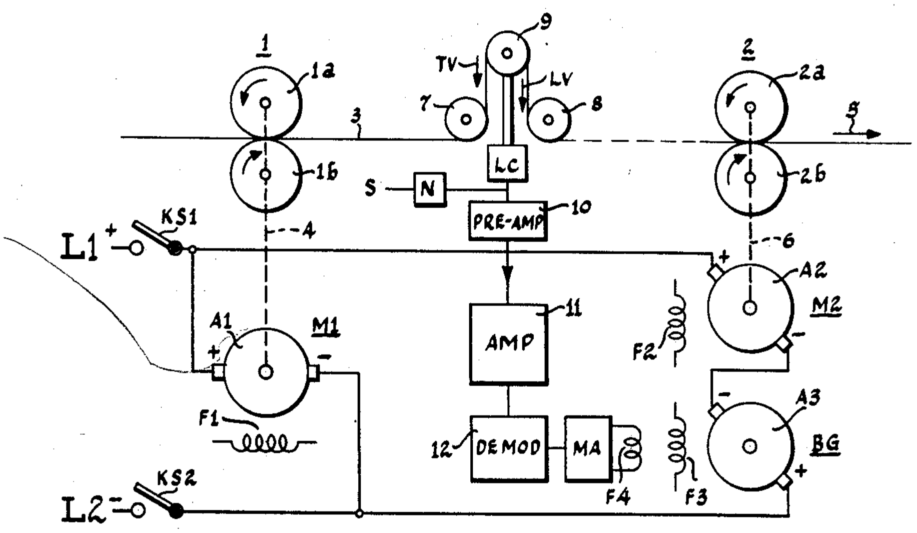
Fig. 1 depicts schematically a tension control system.
Figure 2:
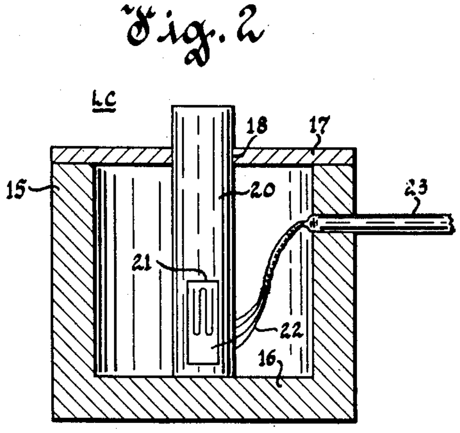
Fig. 2 is a fragmentary sectional view of a load cell employed in the system of Fig. 1.
Figure 3:
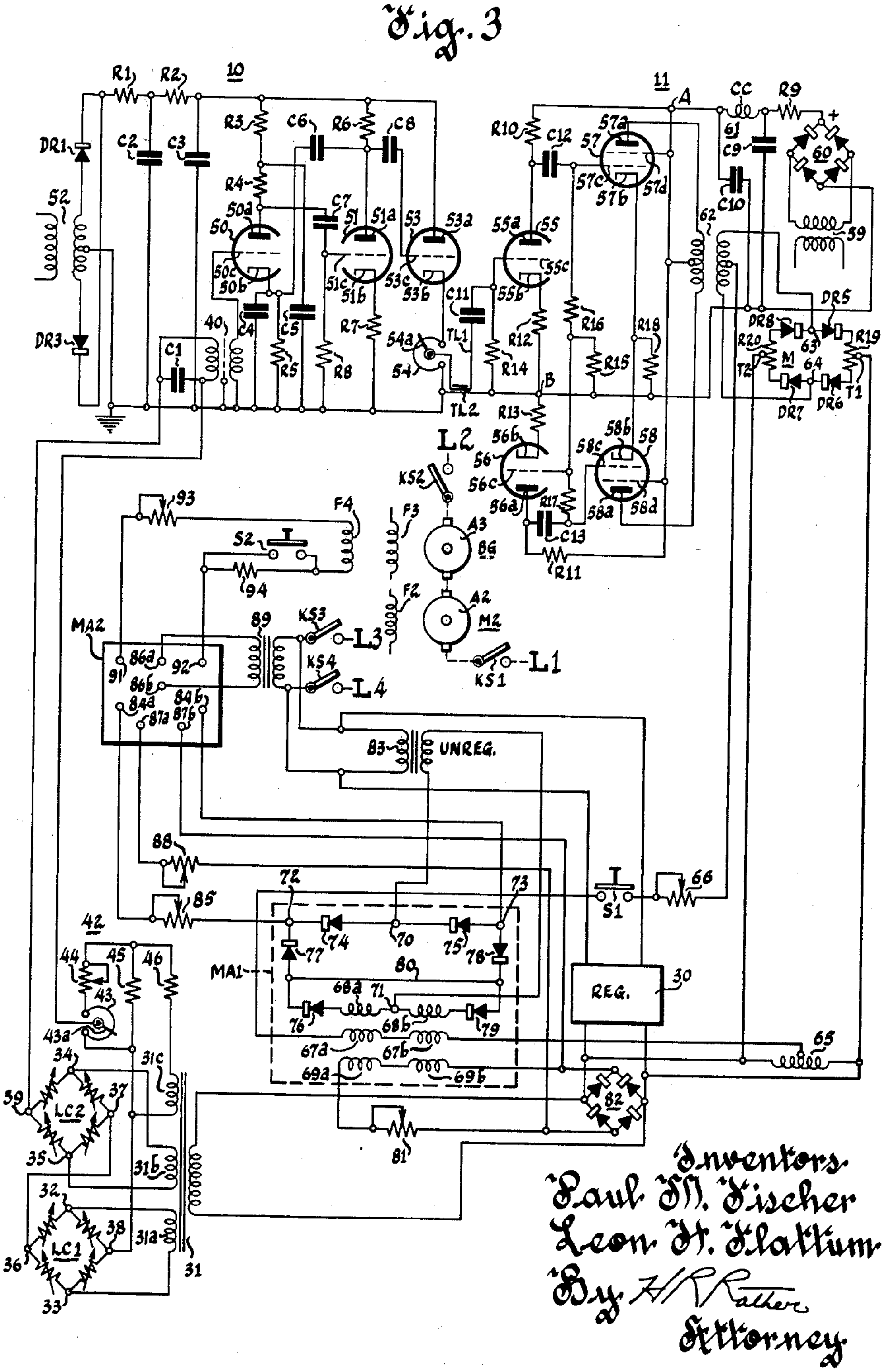
Fig. 3 is a schematic showing of a motor control system employed in the system of Fig. 1 and having in the upper portion thereof an amplifier system constructed in accordance with the present invention.

The tension control system shown in the aforementioned Figs. 1, 2 and 3 is disclosed and claimed in Blakeslee G. Wheeler copending application Serial No. 618,787, filed October 29, 1956, and assigned to the assignee of the present application.

Referring to Fig. 1 there is shown a processing line having two stands 1 and 2 for processing material 3. Stand 1 has a pair of rollers 1*a* and 1*b* for moving material 3 therebetween. A motor M1 is connected as indicated by a broken line 4 to operate rollers 1*a* and 1*b* to move material 3 at a predetermined speed in the right-hand direction indicated by arrow 5. Similarly, stand 2 has a pair of rollers 2*a* and 2*b* for moving material 3 therebetween, while a motor M2 is provided and connected as indicated by broken line 6 to operate rollers 2*a* and 2*b* to move material 3 in the right-hand direction at a speed to maintain a predetermined degree of tension in the portion of the material moving at any instant of time between stands 1 and 2. Interposed between stands 1 and 2 are two rollers 7 and 8 having their axes of rotation in the same horizontal plane and an idler roller 9 having its axis of rotation between and above the aforementioned plane of rollers 7 and 8. As the material 3 leaves stand 1 it moves in a horizontal direction to and below roller 7, then upwardly to and over idler roller 9, downwardly to and under roller 8 and in a horizontal direction to stand 2. Armatures A1 and A2 of motors M1 and M2, respectively, are connected in parallel to be energized from a direct current power supply source (not shown) through lines L1 and L2 and normally-open knife switches KS1 and KS2. Field windings F1 and F2 of motors M1 and M2, respectively, are provided with constant excitation in a suitable well known manner (not shown). It may be assumed that the energization and operational characteristics of motors M1 and M2 are selected so that a desired degree of tension is provided in the portion of the material 3 moving at any instant of time between stands 1 and 2.

To compensate for variations in the tension of material 3, a booster generator BG having an armature A3, an auxiliary field winding F3 provided with constant excitation in a suitable well known manner (not shown) and a booster field winding F4 is provided to control the armature voltage of motor M2. Armature A3 of booster generator BG is series connected with armature A2 of motor M2 across supply line L1 and L2. Booster field winding F4 is energized by a signal transmitter comprising a pair of strain gauge load cells LC through a pre-amplifier 10, an amplifier 11, a demodulator 12 and a magnetic amplifier MA, more fully described hereinafter. One load cell is located under each end of the shaft of idler roller 9 for producing signals corresponding to the tension in material 3. The output signal of the strain gauge load cells is compared in a network N with a reference signal derived from source S and the resultant signal is amplified and demodulated and applied to booster field winding F4 of booster generator BG to produce a voltage for controlling motor M2 in a manner hereinafter more fully described.

Referring to Fig. 2 there is shown a strain gauge load cell LC of a well known type known as a Baldwin Type C Load Cell. Load cell LC has an open end cylindrical housing 15 provided with a base portion 16 and closed by a cover plate 17. Extending through a center hole 18 in cover plate 17 is a high-strength cylindrical steel column 20 having strain gauges 21 bonded to the sides thereof. Strain gauges 21 comprise hairpin-shaped pieces of Nichrome wire or the like bonded to column 20. Four strain gauges 21 are employed, two in the direction of the axis of column 20 and two perpendicular thereto and connected to form a bridge network hereinafter more fully described. Input and output pairs of wires 22 extend from strain gauges 21 to a shielded cable 23. Cable 23 extends through a hole in housing 15 which may contain a seal to close the interior of housing 15 from the atmosphere.

The aforementioned control system for controlling booster generator BG which in turn controls the speed of motor M2 to regulate the tension of material 3 between the two stands 1 and 2 in the processing line and to complete the closed loop system is shown in Fig. 3. Booster generator BG, controlled motor M2, their constituent elements and power supply system in Fig. 3 have been given reference characters corresponding to those in Fig. 1. Power is supplied to series connected armature A2 of motor M2 and armature A3 of booster generator BG from a direct current power supply source (not shown) through lines L1 and L2 and normally-open knife switches KS1 and KS2. Shunt field windings F2 of motor M2 and F3 of booster generator BG are provided with constant excitation in a suitable manner (not shown). Shunt booster field winding F4 of booster generator BG is automatically provided with excitation which varies in accordance with a variation in tension in material 3 from a preselected reference value through the load cells and the control system shown in the remainder of Fig. 3 in a manner hereinafter described.

The control system shown in Fig. 3 comprises two load cells LC1 and LC2, each cell having four strain gauges connected in a bridge network. Regulated alternating current power is supplied to load cells LC1 and LC2 from an alternating current power supply source (not shown) through supply lines L3 and L4, normally-open knife switches KS3 and KS4, a voltage regulating transformer 30, the primary winding and the lower and central secondary windings 31*a* and 31*b*, respectively, of a transformer 31. The lower secondary winding 31*a* of transformer 31 is connected across input terminals 32 and 33 of load cell bridge LC1 while the central secondary winding 31*b* of transformer 31 is connected across input terminals 34 and 35 of load cell bridge LC2. Output terminal 36 of load cell bridge LC1 is connected to terminal 37 of load cell bridge LC2 while output terminal 38 of load cell bridge LC1 and output terminal 39 of load cell bridge LC2 are connected across the primary winding of a step-up transformer 40 and a filter capacitor C1 in parallel connection, the secondary winding of transformer 40 being connected in the input circuit of a pre-amplifier 10. Interposed in the aforementioned connection between output terminal 38 of load cell bridge LC1 and the primary winding of transformer 40 is a network indicated generally at 42 for comparing the combined output voltages of load cells LC1 and LC2 with a portion of the reference voltage across secondary winding 31*c* to obtain a resultant error difference voltage across capacitor C1 and for selectively adjusting the tension of material 3. Network 42 has a first parallel portion including a series connected potentiometer 43 and adjustable resistor 44 in parallel connection with a resistor 45, one end of potentiometer 43 being connected to output terminal 38 while its adjustable center tap 43*a* is connected to the primary winding of transformer 40. Connected across the aforementioned parallel portion of network 42 is a series circuit including a secondary winding 31*c* of transformer 31 and a resistor 46 for providing the aforesaid reference voltage.

Pre-amplifier 10 comprises two pre-amplifier stages in series connection from which the amplified difference voltage is fed into a cathode follower impedance matching device having in its output circuit a sensitivity adjusting potentiometer for adjusting the gain of pre-amplifier 10. The aforementioned two pre-amplifier stages comprise electrical discharge tubes 50 and 51 which may be enclosed in a single duo-triode envelope. Tube 50 has an anode 50*a*, a cathode 50*b* and a control electrode 50*c* connected through the secondary winding of transformer 40 to ground. Supply voltage is applied to the anode-cathode circuit of tube 50 from a regulated alternating current power supply source (not shown) connected across the primary winding of a transformer 52. One end of the secondary winding of transformer 52 is series connected through half-wave rectifier DR1, a resistor R1 and a capacitor C2 to ground while the other end of the secondary winding of transformer 52 is series connected through half-wave rectifier DR3 to the junction of rectifier DR1 and resistor R1. A center tap on the secondary winding of transformer 52 is connected to ground. A resistor R2 and a capacitor C3 are series connected from the junction of resistor R1 and capacitor C2 to ground. The junction of resistor R2 and capacitor C3 is connected through resistors R3 and R4 to anode 50*a* of tube 50 while cathode 50*b* is connected to ground through parallel connected capacitor C4 and resistor R5. The junction of resistors R3 and R4 is connected to ground through a capacitor C5.

Tube 51 has an anode 51*a*, a cathode 51*b* and a control electrode 51*c*. Voltage is supplied to the anode 51*a* from the junction of resistors R2, R3 and capacitor C3 through a resistor R6 while the cathode 51*b* is connected to ground through a resistor R7. Cathode 50*b* of tube 50 is connected through a capacitor C6 to anode 51*a* of tube 51. The anode 50*a* of tube 50 is connected to the control electrode 51*c* of tube 51 through a coupling capacitor C7 while control electrode 51*c* is connected through a grid-leak resistor R8 to ground.

There is further provided a cathode follower electrical discharge tube 53 having an anode 53*a*, a cathode 53*b* and a control electrode 53*c*. Anode voltage is supplied to tube 53 directly from the junction of the aforementioned resistors R3 and R6 while the cathode 53*b* is connected to ground through a potentiometer 54 having an adjustable center tap 54*a* connected to transmission line conductor TL1, conductor TL2 thereof being connected to ground. Anode 51*a* of tube 51 of the pre-amplifier is connected through a coupling capacitor C8 to control electrode 53*c* of cathode follower tube 53. The output voltage of cathode follower tube 53 is fed through the long transmission line conductors TL1–2 to power amplifier 11.

Amplifier 11 comprises an externally excited full-wave parallel inverter stage having electrical discharge tubes 55 and 56 for producing a proper input voltage for an output power amplifier stage having electrical discharge tubes 57 and 58 connected in push-pull relation. Inverter tube 55 has an anode 55*a*, a cathode 55*b* and a control electrode 55*c* while inverter tube 56 has an anode 56*a*, a cathode 56*b* and a control electrode 56*c*. Inverter tubes 55 and 56 may be enclosed in a single envelope, if desired. Voltage is supplied to the anode-cathode circuits of inverter tubes 55 and 56 and power amplifier tubes 57 and 58 from a regulated alternating current power supply source (not shown) through a transformer 59 having its primary winding connected across such source. The secondary winding of transformer 59 is connected across the input terminals of a rectifier bridge 60. The positive output terminal of rectifier bridge 60 is connected through a resistor R9 and a choke coil CC of a filter network 61 to a common point A where it divides. One branch extends through an anode resistor R10 to anode 55*a* of inverter tube 55 while a second branch extends through an anode resistor R11 to anode 56*a* of inverter tube 56. A third branch extends through a center tap and a first half of the primary winding of an output transformer 62 to an anode 57*a* of power amplifier tube 57 while a fourth branch extends through the center tap and the other half of the primary winding of the output transformer 62 to an anode 58*a* of power amplifier tube 58. The negative output terminal of rectifier bridge 60 is connected through filter network 61 to a common point B. Filter network 61 comprises the aforementioned choke coil CC in series connection with the positive terminal of rectifier bridge 60 and a pair of capacitors C9 and C10, capacitor C9 being connected between the negative terminal of rectifier bridge 60 and the junction of choke coil CC and resistor R9 while capacitor C10 is connected between the negative terminal of rectifier bridge 60 and the other end of choke coil CC. The cathodes 55b and 56b of inverter tubes 55 and 56 are connected through resistors R12 and R13, respectively, to common point B.

Transmission line conductor TL1, extending from center tap 54a of potentiometer 54, is connected through a coupling capacitor C11 to control electrode 55c of inverter tube 55, the junction of capacitor C11 and control electrode 55c being connected through a leak resistor R14 to common point B. Transmission line conductor TL2 is connected to common point B.

The output voltage at anode 55a of inverter tube 55 is connected through a coupling capacitor C12 to a parallel circuit having one branch extending to a control electrode 57c of power amplifier tube 57 and another branch extending through resistor R16 to control electrode 56c of inverter tube 56, the latter control electrode being connected through leak resistor R15 to common point B. The output voltage at the anode 56a of inverter tube 56 is connected through a coupling capacitor C13 to a control electrode 58c of power amplifier tube 58 and also to its own control electrode 56c through coupling resistor R17. Cathodes 57b and 58b of power amplifier tubes 57 and 58 are connected together and through a resistor R18 to common point B. Power amplifier tubes 57 and 58 also have screen electrodes 57d and 58d which are connected together and to the anode supply voltage at common point A.

The secondary winding of output transformer 62 is connected across input terminals 63 and 64 of a phase discriminator or modulator network M. The latter comprises two parallel legs, one leg having a half-wave rectifier DR5, a resistor R19 and a half-wave rectifier DR6 series connected between terminal 63 and terminal 64 and the other leg having a half-wave rectifier DR7, a resistor R20 and a half-wave rectifier DR8 series connected between terminal 64 and 63. Switching rectifier pairs DR8, DR5 and DR6, DR7 are poled to alternately conduct as hereinafter described depending upon the polarity of a reference switching voltage applied thereto. A reference voltage derived from the output terminals of regulating transformer 30 is connected across center taps T1 and T2 of resistors R19 and R20, respectively, in the phase discriminator network. Connected in parallel with the latter across the output terminals of regulating transformer 30 is a transformer winding 65. A center tap on the secondary winding of output transformer 62 is series connected through an adjustable resistor 66, a normally-open switch S1 and signal control windings 67a and 67b of a first self-saturating magnetic amplifier MA1 to a center tap on transformer winding 65.

Magnetic amplifier MA1 is a conventional amplifier having a pair of power windings 68a and 68b and a pair of bias windings 69a and 69b in addition to the aforementioned signal control windings. Amplifier MA1 also comprises a pair of input terminals 70 and 71 and a pair of output terminals 72 and 73. Half-wave rectifiers 74 and 75 are connected between input terminal 70 and output terminal 72 and between output terminal 73 and input terminal 70, respectively. Winding 68a is series connected with half-wave rectifiers 76 and 77 between input terminal 71 and output terminal 72 while winding 68b is series connected with half-wave rectifiers 78 and 79 between output terminal 73 and input terminal 71. The common point between rectifiers 76 and 77 is connected through a conductor 80 to the common point between rectifiers 78 and 79. Bias windings 69a and 69b are series connected with an adjustable resistor 81 across the output terminals of a rectifier bridge 82 having its input terminals connected across the output terminals of regulating transformer 30. Power is supplied to input terminals 70 and 71 of amplifier MA1 from the aforementioned alternating current power supply source through supply lines L3 and L4, knife switches KS3 and KS4 and an unregulated transformer 83. Output terminals 72 and 73 of amplifier MA1 are connected across signal control winding input terminals 84a and 84b of a second self-saturating magnetic amplifier MA2 in series connection with an adjustable resistor 85. The aforementioned half-wave rectifiers of amplifier MA1 are so connected in circuit as to form the conducting paths hereinafter described. Since amplifier MA2 is similar in all respects to amplifier MA1, detailed description thereof is herein omitted for the sake of simplicity. Amplifier MA2 comprises a pair of power winding input terminals 86a and 86b and a pair of bias winding input terminals 87a and 87b. Bias winding terminals 87a and 87b are series connected with an adjustable resistor 88 in parallel with bias windings 69a and 69b of amplifier MA1 across the aforementioned output terminals of rectifier bridge 82 while power winding terminals 86a and 86b are supplied from the aforementioned alternating current power supply source through supply lines L3 and L4, knife switches KS3 and KS4 and a transformer 89. Output terminals 91 and 92 are series connected with an adjustable resistor 93 and a resistor 94 across booster field winding F4 of booster generator BG. Normally-open switch S2 is connected across resistor 94 to shunt the latter effectively out of the booster field winding circuit as hereinafter described.

The operation of the motor control system shown in Fig. 3 will now be described. As hereinbefore described, shunt field windings F2 and F3 of motor M2 and booster generator BG, respectively, are provided with a predetermined constant excitation. Let it be assumed that upon the closure of knife switches KS1 and KS2 power is supplied from a direct current supply source (not shown) through supply lines L1 and L2 and the aforementioned knife switches to the series connected armatures A2 and A3 of motor M2 and booster generator BG, respectively. Let it also be assumed that upon the closure of knife switches KS3 and KS4, a circuit is established to supply power from an alternating current power supply source (not shown) to the power windings of amplifier MA1 and power winding terminals of amplifier MA2. The aforementioned circuit may be traced through supply lines L3 and L4 and the then closed knife switches KS3 and KS4 to the primary winding of transformer 83; then from the lower end of the secondary winding of transformer 83 through input terminal 70 of amplifier MA1, rectifier 74, output terminal 72, resistor 85, signal control winding terminals 84a and 84b of amplifier MA2, output terminal 73, rectifiers 78 and 79, winding 68b and input terminal 71 to the upper end of the secondary winding of transformer 83; and from the upper end of the secondary winding of transformer 83 through input terminal 71, winding 68a, rectifiers 76 and 77, output terminal 72, resistor 85, signal winding terminals 84a and 84b of amplifier MA2, output terminal 73, rectifier 75 and input terminal 70 to the lower end of the secondary winding of transformer 83. Closure of knife switches KS3 and KS4 also results in establishment of a circuit for supplying power from the aforementioned alternating current power supply source to the power winding terminals 86a and 86b of amplifier MA2 through transformer 89. Amplifier MA2 is identical in structure to amplifier MA1; however, it should be noted that, whereas the output terminals of amplifier MA1 are connected to signal control winding terminals 84a and 84b of amplifier MA2 to afford two series connected stages of magnetic amplifiers, the output terminals 91 and 92 of amplifier MA2 are connected to the booster field winding F4 of generator BG. Closure of knife switches KS3 and KS4 also results in establishment of a circuit for supplying regulated, rectified alternating current from the aforementioned supply source to the bias windings of amplifier MA1 and the bias winding terminals of amplifier MA2. The latter circuit may be traced through lines L3 and L4, the then closed knife switches KS3 and KS4, regulating transformer 30 and rectifier bridge 82 where it divides. One branch continues through resistor 81 to bias windings 69a and 69b of amplifier MA1 while the other parallel branch continues through resistor 88 to bias winding terminals 87a and 87b of amplifier MA2. Closure of knife switches KS3 and KS4 further results in establishment of a circuit for supplying regulated alternating current from the aforementioned supply source to transformer winding 65, network 42 and load cell bridges LC1 and LC2. The latter circuit may be traced through supply lines L3 and L4, the then closed knife switches KS3 and KS4 and regulating transformer 30 where it divides. One branch continues to transformer winding 65 while the other parallel branch continues through the primary winding of transformer 31 and secondary windings 31a and 31b to the aforementioned input terminals of load cell bridges LC1 and LC2, respectively, and through secondary winding 31c to network 42.

As hereinbefore described, controlled motor M2 has a constant field excitation and an armature voltage regulated by booster generator BG as a function of the excitation of its booster field winding F4, the energization of the latter being a function of the variation in the value of tension in material 3 (Fig. 1) from that preselected by adjustment of center tap 43a of potentiometer 43 (Fig. 3). The armature voltage of motor M2 determines the speed of the latter to adjust the tension to such preselected value.

Let it be assumed that a change occurs in the value of tension in material 3. This action alters the force being applied by idler roller 9 (Fig. 1) on columns 20 (Fig. 2) of the load cells positioned under each end of the shaft of the idler roller. Such alteration in applied force is directly proportional to the change in tension because the tension vector TV is parallel to the loading vector LV of the sensing cells as seen in Fig. 1. An alteration in applied force results in a corresponding alteration in strain in columns 20 and strain gauges 21 bonded thereto. As a result, the latter undergo resistance changes precisely proportional to applied strains. Since the wires of the strain gauges in load cell bridges LC1 and LC2 carry an electric current applied through transformer 31 and its secondary windings 31a and 31b, changes in resistance result in unbalancing the load cell bridges to produce a signal voltage at output terminals 38 and 39 which is a representation of the instantaneous total tension in material 3. Material 3 may comprise a plurality of cords. In order to obtain a representation of the sum of the tensions in such cords, it is necessary to employ two load cell bridges, one under each end of the shaft of idler roller 9. The signal voltage at output terminals 38 and 39 is compared in network 42 with the aforementioned reference voltage derived from the regulated power supply source through secondary winding 31c of transformer 31. The resultant alternating current error difference voltage is applied to the primary winding of transformer 40 having a filter capacitor C1 connected thereacross. The difference voltage between the signal voltage at the output terminals 38 and 39 of the load cell bridges and the reference voltage across potentiometer 43 is controlled by the forces applied to the load cells. The phases of the voltages applied to the load cell bridges through transformer 31 are such that an increasing output from the bridges causes the error difference voltage applied to transformer 40 to approach zero. Thus, an increase in the voltage at the output terminals of the load cell bridges as a result of an increase in the forces being applied to the latter by idler roller 9 reduces the output voltage from amplifier MA2 to booster field winding F4 to decrease such forces and vice versa.

Load cell bridges LC1 and LC2 and network 42 could alternatively be supplied from a direct current power supply source in conjunction with a chopper, inverter or the like for converting the resultant direct current error difference voltage to alternating current voltage to be applied across capacitor C1 of pre-amplifier 10.

Rectified alternating current anode voltage for pre-amplifier tubes 50 and 51 and cathode follower tube 53 is derived from the aforementioned power supply source through transformer 52. The voltage appearing across the secondary winding of transformer 52 is applied across capacitor C2 in a circuit extending from the upper end of the secondary winding through rectifier DR1, resistor R1 and capacitor C2 to the grounded center tap of the secondary winding; and from the lower end of the secondary winding of transformer 52 through rectifier DR3, resistor R1 and capacitor C2 to the aforesaid grounded center tap. The direct current voltage appearing across capacitor C2 is applied through resistor R2 across capacitor C3 while the voltage across the latter is applied in three parallel connections to the anodes of tubes 50, 51 and 53.

The aforementioned resultant error difference voltage is applied through the secondary winding of transformer 40 to control electrode 50c of the first pre-amplifier tube 50. The error voltage is amplified in tube 50 and fed from anode 50a of the latter to the control electrode 51c of tube 51 through coupling capacitor C7. The error voltage is amplified further in tube 51 and then applied through coupling capacitor C8 to the control electrode 53c of cathode follower tube 53. The latter tube is utilized to obtain a low output impedance for pre-amplifier 10. Inasmuch as pre-amplifier 10 is located in the area of the load cells whereas power amplifier 11 is at a remote location therefrom, represented by transmission line conductors TL1 and TL2, a low output impedance at pre-amplifier 10 will effectuate shorting out spurious or stray voltages which might be picked up and which otherwise might introduce errors in the control voltage finally applied to booster field winding F4 of generator BG. The output voltage from cathode follower tube 53 appears across sensitivity potentiometer 54, the tap 54a of which may be adjusted to alter the gain of pre-amplifier 10. Adjustment of tap 54a of potentiometer 54 in a clockwise direction toward the end of the latter that is connected to cathode 53b increases the gain of pre-amplifier 10 while adjustment of tap 54a in the opposite, counterclockwise direction decreases the gain. The adjusted voltage derived from potentiometer 54 is fed through the long transmission line conductors TL1 and TL2 and coupling capacitor C11 to the inverter stage comprising tubes 55 and 56 in the input circuit of power amplifier 11. The inverter stage is utilized for the purpose of obtaining the proper input electrical waves for the push-pull amplifier output stage comprising tubes 57 and 58. Inverter tube 55 electrically isolates the load cells from the reference voltage circuit of the phase discriminator to prevent circulating currents therebetween.

Let it be assumed that a positive portion of the alternating current signal voltage transmitted through transmission line conductors TL1 and TL2 is applied to control electrode 55c of inverter tube 55. Control electrode 55c being thus rendered more positive increases the conduction through tube 55 to decrease the anode voltage of the latter toward the normal tube voltage drop. The aforesaid decrease in anode voltage is transferred through coupling capacitor C12 to the control electrode 57c of power amplifier tube 57 and through resistor R16 to the control electrode 56c of inverter tube 56 to render tubes 57 and 56 non-conducting, assuming that the latter two tubes were conducting in response to a previous negative portion of the signal voltage. Immediately thereafter, a negative portion of the signal voltage is applied to control electrode 55c of inverter tube 55 to decrease conduction through the latter and increase its anode voltage above the normal tube voltage drop. Such increase in anode voltage is transferred through capacitor C12 to the aforesaid control electrodes of tubes 56 and 57 to render the same conducting. As a result the anode voltage of inverter tube 56 decreases toward the normal tube voltage drop and such decrease is transferred through coupling capacitor C13 to control electrode 58c of amplifier tube 58 to render the latter non-conducting. Thus, it should be apparent that the alternating current signal voltage controls inverter tube 55 which in turn reversely controls tubes 56 and 57 and that tube 56 controls tube 58 reversely relative to tube 56. It is therefore seen that power amplifier tubes 57 and 58 alternately conduct in push-pull relation to apply an amplified alternating current signal voltage to the primary winding of output transformer 62.

The alternating current output signal voltage appears across the secondary winding of transformer 62 and is applied across the input terminals 63 and 64 of phase discriminator network M. An alternating current reference voltage which is fixed in magnitude and phase is applied across center taps T1 and T2 of resistors R19 and R20, respectively, from the aforementioned output terminals of regulating transformer 30 in parallel connection with transformer winding 65. Switching rectifiers DR8, DR5 and DR6, DR7 alternately conduct in pairs according to whether tap T2 is positive or negative, respectively, relative to tap T1.

Let it be assumed that at a given instant of time center tap T2 is positive relative to center tap T1 to render the first pair of rectifiers conducting in a circuit extending from the left-hand end of transformer winding 65 through center tap T2 and the upper portion of resistor R20, rectifiers DR8 and DR5, the upper portion of and center tap T1 of resistor R19 to the right-hand end of transformer winding 65. Conversely, when center tap T2 is negative relative to center tap T1 the second pair of rectifiers is rendered conductive in a circuit extending from the right-hand end of transformer winding 65 through center tap T1 and the lower portion of resistor R19, rectifiers DR6 and DR7 and the lower portion of and center tap T2 of resistor R20 to the left-hand end of transformer winding 65. The signal voltage appearing across the secondary winding of transformer 62 may have a value anywhere from zero magnitude to a predetermined desirable magnitude and may be either in-phase or out-of-phase with the reference voltage applied to center taps T1 and T2. Thus, it will be seen that a rectified alternating current output voltage which is sensitive to the relative phases of the signal voltage and the reference voltage is derived in the circuit extending from the center tap of the secondary winding of transformer 62 to the center tap of transformer winding 65. For the in-phase condition wherein resistor tap T2 and the upper end of the secondary winding of transformer 62 are both positive, the output circuit may be traced from the upper end of the secondary winding through terminal 63, rectifier DR5, the upper portion and tap T1 of resistor R19, the right-hand portion and center tap of winding 65, signal control windings 67*b* and 67*a* of amplifier MA1, switch S1 and resistor 66 to the center tap of the secondary winding of transformer 62. For the out-of-phase condition wherein resistor tap T2 and the center tap of the secondary winding of transformer 62 are both positive the output circuit may be traced from the center tap of the secondary winding through resistor 66, switch S1, signal control windings 67*a* and 67*b*, the center tap and the left-hand end of transformer winding 65, tap T2 and the upper portion of resistor R20, rectifier DR8 and terminal 63 to the upper end of the secondary winding of transformer 62. Similar output circuits may be traced for in-phase and out-of-phase conditions for the instant of time when resistor tap T2 is negative relative to resistor tap T1 with the difference that the latter output circuits extend through the then conducting rectifiers DR7 and DR6, respectively, and the lower portion of the secondary winding of transformer 62.

Although the aforementioned phase discriminator network M provides a rectified alternating current output voltage derived as a result of the hereinbefore described in-phase and out-of-phase relations, only that portion of the output voltage wave which is derived as a result of one phase relation is utilized. This is for the reason that the output voltage wave derived as a result of the other phase relation is of such direction that it will energize signal control windings 67*a* and 67*b* of amplifier MA1 to bias the latter off while only the former voltage wave drives amplifier MA1 to produce an amplified output voltage proportional to the aforementioned variation in tension.

The amplified output voltage of amplifier MA1 is applied through output terminals 72 and 73 thereof and resistor 85 to signal control winding terminals 84*a* and 84*b* of second magnetic amplifier MA2 wherein it is further amplified and fed through output terminals 91 and 92 of the latter to booster field winding F4 of booster generator BG. The latter circuit may be traced from output terminal 91 through resistor 93, winding F4, and resistor 94 to output terminal 92. The primary function of switch S2 is to insert resistor 94 in series connection with booster field winding F4 when a splice is in the tensioning area between stands 1 and 2 to limit the maximum tension below the breaking point of the fabric splice. While switch S2 connected across resistor 94 and switch S1 in series connection with signal control windings 67*a* and 67*b* of amplifier MA1 are shown as separate switches, they may be combined in a unitary three-position switch having two normally-open contacts selectively operable manually, electromagnetically or by other suitable means. Switches S1 and S2 in combination have an "on" position, a "splice" position and an "off" position. In the "on" position both switches S1 and S2 are closed, in the "splice" position switch S1 is closed and switch S2 is open, and in the "off" position switch S1 is open. Let it be assumed that switches S1 and S2 are operated to the "on" position. Closure of switch S1 establishes a circuit from phase discriminator M through amplifiers MA1 and MA2 to booster field winding F4. Closure of switch S2 shunts resistor 94 effectively out of the booster field winding circuit to permit energization of winding F4 as a function of the error difference voltage derived from network 42. A change in the voltage across booster field winding F4 in proportion to a variation in the value of tension in material 3 produces a corresponding change in the output voltage of generator BG to increase or decrease the armature voltage of motor M2. Such increase or decrease in the armature voltage of motor M2 produces a corresponding increase or decrease in the speed of the latter to adjust the tension in material 3 to the preselected desired value. Upon operation of the aforementioned switches to the "splice" position, opening of switch S2 inserts resistor 94 in series connection with winding F4 to limit the maximum tension below the breaking point of the fabric splice. Upon operation of the switches to the "off" position, opening of switch S1 disconnects the error difference voltage from winding F4 to terminate regulation of the tension.

The tension in material 3 may selectively be changed by adjustment of center tap 43*a* of potentiometer 43 to adjust the value of the error difference voltage applied to pre-amplifier 10. Adjustment of center tap 43*a* toward resistor 44 adjacent thereto results in a greater output from amplifier MA2 to increase the excitation of booster field winding F4 with a consequent increase in the energization of armature A2 of motor M2 to increase the tension in the material being processed. Conversely, adjustment of center tap 43*a* in the opposite direction results in decreased energization of armature A2 to decrease the tension in the material.

The above description of the operation of the control system is devoted to regulating tension of the material under conditions wherein such material is moving through the processing line at a rate between 0 and 100 percent of the speed of the aforementioned motor M1. It should be apparent that the control system is equally effective to regulate tension of the material under "standstill" conditions. Let it be assumed that motor M1 (Fig. 1) is reduced to zero speed resulting in an increase in the tension of material 3. The force, corresponding to such increase, applied to the load cells immediately elicits a response from the control system as hereinbefore described to automatically reduce the armature voltage of motor M2 to a low value productive, however, of sufficient torque to maintain the tension of material 3 at the preselected desired value.

We claim:

1. In a high gain amplifier system for accurately sensing amplitude changes in input signal level over a wide range wherein portions of the system are remotely located from one another, in combination, preamplifier means operable to receive and amplify an electrical input signal which is variable in amplitude and has a constant frequency, power amplifier means remote from said preamplifier means operable to further amplify said input signal, means comprising a transmission line coupling said preamplifier means to said power amplifier means, said preamplifier means including means affording a low output impedance therefor whereby to dissipate stray electrical voltages induced in said transmission line, a discriminating network coupled to receive the amplified signal from said power amplifier means, and means for applying to said network a reference voltage of said constant frequency to render said network active to provide an amplified unidirectional output signal proportional to the amplitude of said input signal over a wide range.

2. The invention defined in claim 1, wherein said preamplifier means comprises a plurality of preamplifier stages and said low output impedance means comprises a cathode follower electric discharge device having a low output impedance connected between said preamplifier means and said transmission line.

3. The invention defined in claim 2, together with sensitivity adjusting means comprising a potentiometer connected between said discharge device and said transmission line.

4. The invention defined in claim 1, wherein said power amplifier means comprises a push-pull amplifier stage and an externally-excited electronic inverter device connected between said transmission line and said push-pull amplifier stage, the latter being connected to said discriminating network, said inverter device being operable to drive said push-pull amplifier stage in response to the signal received from said transmission line and to electrically isolate said push-pull amplifier stage from said preamplifier means to prevent circulation of electrical currents therebetween.

5. In an amplifier system having a high amplification factor and being capable of transmitting a signal between remote points with minimum distortion, a source of input signal voltage having a predetermined constant frequency and which varies in amplitude, preamplifier means for receiving and amplifying said input signal voltage, electric discharge means coupled to said preamplifier means for providing the latter with a low output impedance to minimize pick-up of stray voltages, a long transmission line, power amplifier means remote from said electric discharge means and coupled to the latter through said long transmission line, said power amplifier means comprising a power amplifier stage and means for inverting said signal voltage to drive said power amplifier stage to afford an amplified signal voltage proportional to the amplitude of said input signal voltage, a rectifier network, means for coupling said power amplifier stage to said rectifier network, and means for applying a reference voltage having said predetermined constant frequency to said rectifier network to render the latter effective to provide a rectified output voltage proportional in amplitude to the amplitude of said input signal voltage and of a given polarity depending on whether the amplified signal voltage applied to said rectifier network and said reference voltage are substantially in-phase or substantially out-of-phase.

6. In a high gain linear amplifier system wherein portions of the system are remotely located from one another, preamplifier means operable to receive and amplify an input signal of constant frequency which varies in amplitude, means comprising a cathode follower electric discharge device affording said preamplifier means a low output impedance whereby to dissipate stray voltages, power amplifier means remote from said preamplifier means, means comprising a transmission line coupling said cathode follower device to said power amplifier means, said power amplifier means comprising inverting and amplifying means to afford an amplified signal voltage proportional to the amplitude of said input signal voltage, a phase discriminating network, transformer means coupling said amplified signal voltage from said power amplifier means to said network at a first portion thereof, and means for applying to said network at a second portion thereof a control voltage having said constant frequency to render said network operative to afford a unidirectional output voltage proportional to the amplitude of said input signal voltage over a wide range of amplitudes, said unidirectional output voltage having a first polarity when said amplified signal voltage and said control voltage are in phase and having the opposite polarity when the same are substantially 180 degrees out of phase.

7. The invention defined in claim 6, wherein said phase discriminating network comprises two pairs of half-wave rectifiers, the rectifiers of one pair being connected for series conduction in one direction and the rectifiers of the other pair being connected for series conduction in the other direction, a terminal at the junction of the rectifiers of each said pair forming a first pair of terminals, a second pair of terminals, means connecting a first rectifier of each said pair to a first terminal of said second pair of terminals, and means connecting a second rectifier of each said pair to the other terminal of said second pair of terminals, said transformer means being connected to one of said pairs of terminals and said control voltage means being connected to the other pair of said terminals.

8. The invention defined in claim 7, wherein said transformer means and said control voltage means are each provided with a center tap, said center tap being connectable across a load for unidirectional energization thereof in accordance with said input signal.

References Cited in the file of this patent

UNITED STATES PATENTS

| | | |
|---|---|---|
| 2,200,055 | Burnett | May 7, 1940 |
| 2,252,613 | Bingley | Aug. 12, 1941 |
| 2,425,009 | Shepherd | Aug. 5, 1947 |
| 2,569,697 | Semm et al. | Oct. 2, 1951 |
| 2,626,321 | Pan | Jan. 20, 1953 |
| 2,650,996 | Jaeschke | Sept. 1, 1953 |
| 2,751,495 | Grady | June 19, 1956 |
| 2,815,407 | Hafler | Dec. 3, 1957 |